United States Patent
Chu et al.

(10) Patent No.: US 9,762,052 B2
(45) Date of Patent: Sep. 12, 2017

(54) CIRCUIT AND METHOD OF ELECTRICALLY DECOUPLING NODES

(71) Applicant: TAIWAN SEMICONDUCTOR MANUFACTURING COMPANY, LTD., Hsinchu (TW)

(72) Inventors: Chia-Hung Chu, Hsinchu (TW); Kuo-Ji Chen, Wu-Ku (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 848 days.

(21) Appl. No.: 14/015,945

(22) Filed: Aug. 30, 2013

(65) Prior Publication Data

US 2014/0268449 A1     Sep. 18, 2014

Related U.S. Application Data

(60) Provisional application No. 61/799,433, filed on Mar. 15, 2013.

(51) Int. Cl.
    *H02H 9/00*      (2006.01)
    *H02H 9/04*      (2006.01)

(52) U.S. Cl.
    CPC .................... *H02H 9/046* (2013.01)

(58) Field of Classification Search
    USPC .......................................................... 361/56
    See application file for complete search history.

(56) References Cited

U.S. PATENT DOCUMENTS

| | | | | |
|---|---|---|---|---|
| 4,930,037 A | * | 5/1990 | Woo | H01L 27/0251 257/357 |
| 5,946,177 A | | 8/1999 | Miller et al. | |
| 6,861,874 B1 | * | 3/2005 | Chen | H03K 19/00315 326/81 |
| 7,315,438 B2 | | 1/2008 | Hargrove et al. | |
| 7,706,114 B2 | * | 4/2010 | Huang | H02H 9/046 361/56 |
| 7,911,752 B1 | * | 3/2011 | Lin | H02H 9/046 361/56 |

(Continued)

FOREIGN PATENT DOCUMENTS

| | | |
|---|---|---|
| EP | 1356524 | 8/2007 |
| TW | 200937790 | 9/2009 |

OTHER PUBLICATIONS

Office Action dated Mar. 18, 2015 from corresponding No. TW 103103886.

*Primary Examiner* — Ronald W Leja
(74) *Attorney, Agent, or Firm* — Hauptman Ham, LLP

(57) ABSTRACT

A device includes a first power node, a second power node, a first input node, a second input node, a protected circuit, and a switch circuit. The protected circuit is coupled between the first power node and the second power node, and the protected circuit is further coupled with the second input node. The switch circuit is coupled with the first power node, the second power node, the first input node, and the second input node. The switch circuit is configured to electrically decouple the first input node and the second input node after (a) the first power node is floating or electrically coupled to the second power node and (b) a voltage level at the first input node is greater than a voltage level at the second power node by a predetermined voltage value.

20 Claims, 4 Drawing Sheets

(56) References Cited

U.S. PATENT DOCUMENTS

| | | | |
|---|---|---|---|
| 2002/0071230 A1* | 6/2002 | Colclaser | H01L 27/0266 361/56 |
| 2007/0047164 A1* | 3/2007 | Biagi | H02H 9/046 361/78 |
| 2007/0247771 A1* | 10/2007 | Chen | H02H 9/046 361/56 |
| 2008/0316660 A1* | 12/2008 | Huang | H02H 9/046 361/56 |
| 2009/0303646 A1* | 12/2009 | Huang | H02H 3/22 361/58 |
| 2010/0123984 A1* | 5/2010 | Lin | H01L 27/0288 361/56 |
| 2013/0215539 A1* | 8/2013 | Chu | H02H 9/046 361/56 |
| 2013/0265677 A1* | 10/2013 | Prabhu | H01L 27/0292 361/56 |
| 2014/0268449 A1* | 9/2014 | Chu | H02H 9/046 361/56 |

* cited by examiner

US 9,762,052 B2

CIRCUIT AND METHOD OF ELECTRICALLY DECOUPLING NODES

CROSS-REFERENCE

The present application claims priority benefit of U.S. Provisional Application No. 61/799,433, filed Mar. 15, 2013, which application is incorporated herein by reference in its entirety.

BACKGROUND

An electrostatic discharge (ESD) event refers to a momentary current surge flowing to, from, or within a circuit, where the momentary current surge has an excessive amount of current and may cause damage to the circuit. Many electrical circuits and devices are susceptible to damage caused by ESD events. ESD protection circuits are usually implemented in a chip to protect the devices and circuits on the chip from ESD damage. Operations of ESD protection circuits generally include one or a combination of the following mechanisms: dissipating the ESD current using a low-impedance discharging path, clamping an ESD induced voltage to a predetermined safe level, and etc.

DESCRIPTION OF THE DRAWINGS

One or more embodiments are illustrated by way of example, and not by limitation, in the figures of the accompanying drawings, wherein elements having the same reference numeral designations represent like elements throughout and wherein.

Like reference numbers in the various drawings are used to indicate like elements.

DETAILED DESCRIPTION

Figure 1:
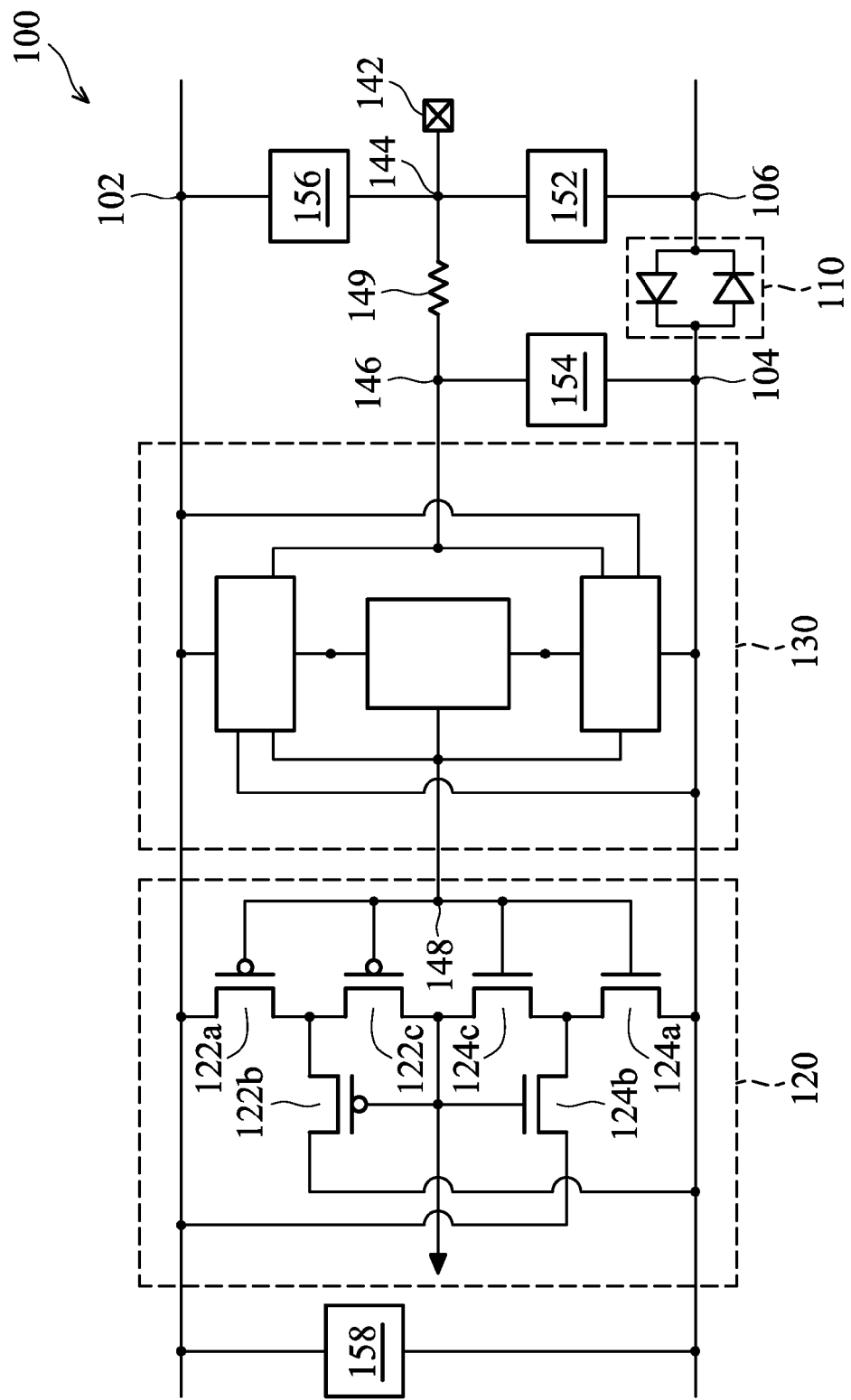
FIG. 1 is a block diagram of an electrical device in accordance with some embodiments.

It is understood that the following disclosure provides one or more different embodiments, or examples, for implementing different features of the disclosure. Specific examples of components and arrangements are described below to simplify the present disclosure. These are, of course, examples and are not intended to be limiting. In accordance with the standard practice in the industry, various features in the drawings are not drawn to scale and are used for illustration purposes only.

FIG. 1 is a block diagram of an electrical device 100 in accordance with some embodiments. Electrical device 100 includes a first power node 102, a second power node 104, a third power node 106, an isolating unit 110 between second power node and third power node, a protected circuit 120 coupled between first power node and second power node, and a switch circuit 130 also coupled between first power node and second power node. Electrical device 100 also includes an input pad 142, an intermediate input node 144 coupled to input pad, a first input node 146 coupled to switch circuit 130, a second input node 148 coupled to switch circuit 130 and protected circuit 120, and resistor 149 coupled between nodes 144 and 146.

In some embodiments, resistor 149 is used to represent parasitic resistance between nodes 144 and 146 for analyzing ESD protection circuit designs. For example, an ESD event is usually modeled by a current pulse flowing into or out of input pad 142. Resistor 149 is usable to model an induced voltage at input node 146 responsive to the ESD event. In some embodiments, resistor 149 is a conductive line in electrical device 100 connecting input nodes 144 and 146, and thus is not a physical resistive component. In some embodiments, resistor 149 also includes a physical resistive component having a predetermined resistance value.

In some embodiments, power node 102 is coupled to a positive voltage source, and power node 104 is coupled to a negative voltage source or ground. Power node 106 is coupled to another negative voltage source or ground which has the same voltage level as node 104. Isolation unit 110 works as a isolator for normal operation and as a conductive path during an ESD event. Protected circuit 120 is powered by a power domain defined by power nodes 102 and 104. In the embodiment depicted in FIG. 1, protected circuit 120 also has P-type metal-oxide-semiconductor (PMOS) transistors 122a, 122b, and 122c and N-type metal-oxide-semiconductor (NMOS) transistors 124a, 124b, and 124c arranged to function as an input stage of protected circuit 120. Protected circuit 120 receives an input signal through a path including input pad 142, intermediate node 144, first input node 146, switch circuit 130, second input node 148, and transistors 122a-c and 124a-c. Protected circuit 120 further has electrical components (not shown) interconnected to perform one or more functions such as data storage, processing, analog signal processing, and/or digital signal processing according to the input signal received at input node 148.

Switch circuit 130 is coupled between first input node 146 and second input node 148. Switch circuit 130 electrically couples first input node 146 and second input node 148 during a normal operation mode (i.e., without an ESD event). Thus, protected circuit 120 is capable of receiving signals from input pad 142. However, when electrical device 100 is powered off and an ESD event occurs at the input pad 142, switch circuit 130 electrically decouples first input node 146 from second input node 148 in order to protect one or more electrical components of protected circuit 120, such as transistors 122a-c and 124a-c, from being stressed by the ESD event.

Electrical device 100 also includes one or more Grounded Gate NMOS (GGN) protection circuits 152 and 154, a Gate Driven PMOS (GDP) protection circuit 156, and a power clamp (PC) circuit 158. GGN protection circuits 152, 154, GDP protection circuit 156, and PC circuit 158 are implemented to protect the protected circuit 120 from damage by an ESD event occurs under circumstances other than the scenario described above. In particular, responsive to an ESD event, GGN protection circuits 152, 154 create conductive paths between input pad 142 to power nodes 104 and 106, which are in turn connected to a negative power source or ground. GDP protection circuit 156 creates conductive paths between input pad 142 to power nodes 102, which is in turn connected to a positive power source. PC circuit 158 is usable to create a conductive path between power nodes 102 and 104 when a voltage difference therebetween is greater than a predetermined voltage value. Operations of GGN protection circuits 152, 154, GDP protection circuit 156, PC circuit 158, and voltage clipper 110 are known to a person having ordinary skill in the art, and thus are not described in detail.

In some embodiments, when a positive power supply voltage at the first power node is about 1.6 V to 2 V and a negative power supply voltage at the third power node is 0 V, the predetermined voltage value ranges from 6 V to 8 V during an ESD event. In some embodiments, when a positive power supply voltage at the first power node is about 2.2 V to 3.6 V and a negative power supply voltage at the third power node is 0 V, the predetermined voltage value ranges from 12 V to 15 V during an ESD event.

Figure 2:
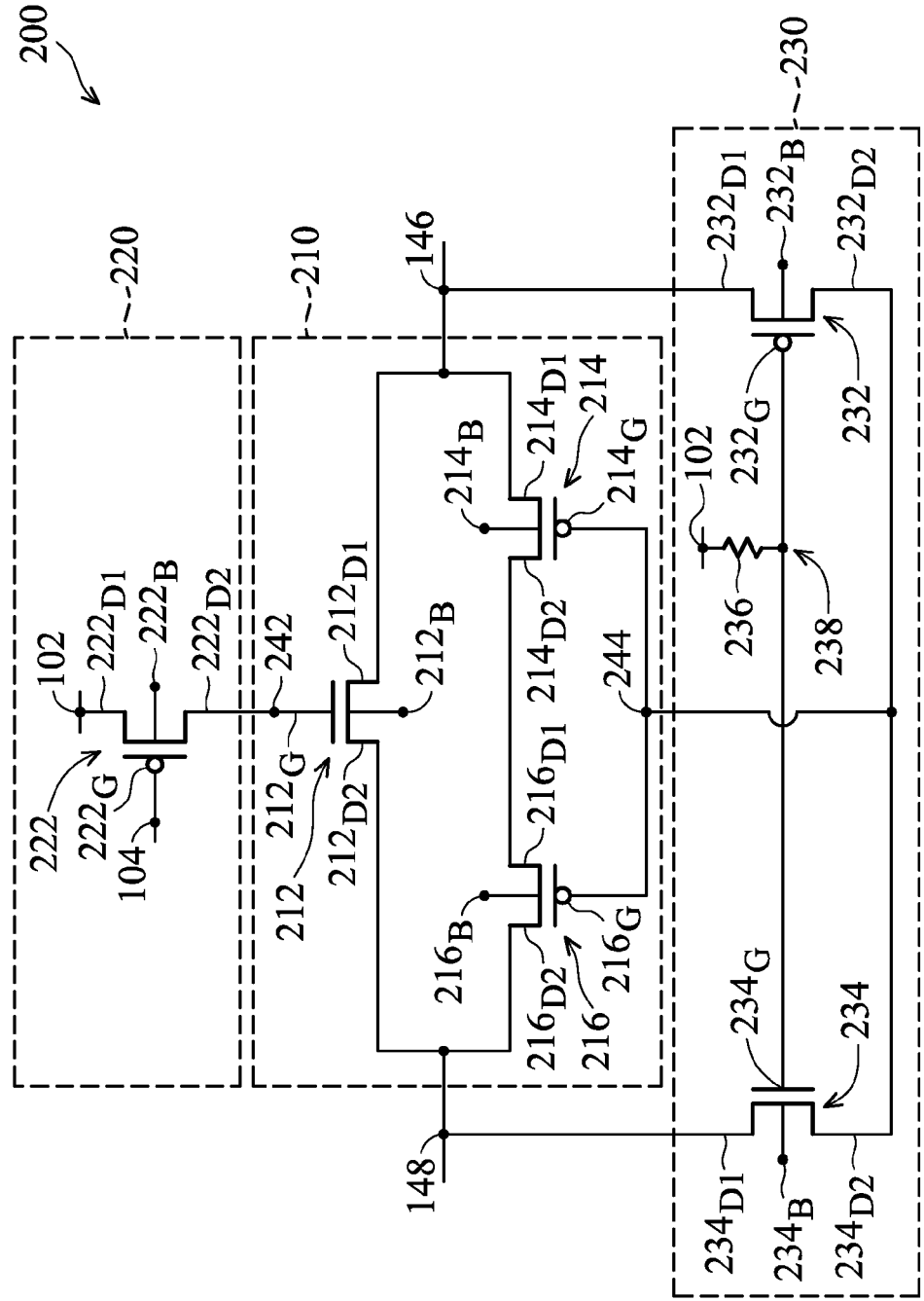
FIG. 2 is a switch circuit in accordance with some embodiments.

FIG. 2 is a switch circuit 200 in accordance with some embodiments. Switch circuit 200 is usable as the switch circuit 130 depicted in FIG. 1. Switch circuit 200 is coupled with the first power node 102, the second power node 104, the first input node 146, and the second input node 148. Switch circuit 200 is configured to electrically decouple the first input node 146 and the second input node 148 after (a) the first power node 102 is floating or electrically coupled to the second power node 104 and (b) a voltage level at the first input node 146 is greater than a voltage level at the second power node 104 by a predetermined voltage value.

Switch circuit 200 includes a transmission gate 210, a first detection circuit 220, and a second detection circuit 230. Transmission gate 210 is coupled between first input node 146 and second input node 148. First detection circuit 220 is coupled to the transmission gate 210 at a first control node 242. Second detection circuit 220 is coupled to the transmission gate 210 at a second control node 244. Transmission gate 210 is configured to electrically couple or decouple the first input node 146 and the second input node 148 responsive to the voltage level at the first control node 242 and the voltage level at the second control node 244.

Transmission gate 210 includes an NMOS transistor 212 coupled between the first input node 146 and the second input node 148. NMOS transistor 212 is controllable by the voltage level at the first control node 242. NMOS transistor 212 includes a first source or drain (S/D) terminal $212_{D1}$ coupled to the first input node 146, a second S/D terminal $212_{D2}$ coupled to the second input node 148, a gate terminal $212_G$ coupled to the first control node 242, and a bulk terminal $212_B$. In some embodiments, bulk terminal $212_B$ is coupled to the second power terminal 104. Only one NMOS transistor 212 coupled between nodes 146 and 146 is depicted in FIG. 2. In some embodiments, there are two or more NMOS transistors connected in series between nodes 146 and 148. In some embodiments, more NMOS transistors are used to improve isolation between nodes 146 and 148 when the transmission gate 210 is turned off. In some embodiments, less NMOS transistors are used to reduce signal delay between nodes 146 and 148 when the transmission gate 210 is turned on. In at least one embodiment, only one NMOS transistor in transmission gate 210, as depicted in FIG. 2.

Transmission gate 210 further includes PMOS transistors 214 and 216. PMOS transistor 214 has a first S/D terminal $214_{D1}$ coupled to the first input node 146, a second S/D terminal $214_{D2}$, a gate terminal $214_G$ coupled to the second control node 244, and a bulk terminal $214_B$. PMOS transistor 216 has a first S/D terminal $216_{D1}$ coupled to the second S/D terminal $214_{D2}$ of the PMOS transistor 214, a second S/D terminal $216_{D2}$ coupled to the second input node 148, a gate terminal $216_G$ coupled to the second control node 244, and a bulk terminal $216_B$. The biasing of bulk terminals $214_B$ and $216_B$ will be described in detail in conjunction with FIG. 3.

Only two PMOS transistors 214 and 216 connected in series between nodes 146 and 148 are depicted in FIG. 2. In some embodiments, there is less or more than two PMOS transistors connected in series between nodes 146 and 148. In some embodiments, more PMOS transistors are used to improve isolation between nodes 146 and 148 when the transmission gate 210 is turned off. In some embodiments, less PMOS transistors are used to reduce signal delay between nodes 146 and 148 when the transmission gate 210 is turned on.

In at least one embodiment, only two PMOS transistors in transmission gate 210, as depicted in FIG. 2. In some embodiments, without the presence of an ESD event, the voltage level at second control node 244 is initially at a relative low voltage level and PMOS transistors 214 and 216 are turned on. Meanwhile, the voltage level needed to turn off PMOS transistors 214 and 216 at second control node 244 is developed from the second detection circuit 230 after occurrence of an ESD event, which will take some time by switching on at least one transistor (such as PMOS transistor 232). Therefore, in at least one embodiment, PMOS transistor 214 is configure to overcome the time delay for developing the voltage level at second control node 244 after an ESD event, and thus PMOS transistor 216 is capable of timely isolate input nodes 146 and 148 responsive to the ESD event.

In some embodiments, transmission gate 210 is capable of providing a non-threshold voltage drop connection between input nodes 146 and 148 during the normal operation mode.

First detection circuit 220 is configured to set a voltage level at the first control node 242 responsive to a voltage level at the first power node 102, the voltage level at the second power node 104, and the voltage level at the first input node 146. First detection circuit 220 includes a PMOS transistor 222 having a first S/D terminal $222_{D1}$ coupled to the first power node 102, a second S/D terminal $222_{D2}$ coupled to the first control node 242, a gate terminal $222_G$ coupled to the second power node 104, and a bulk terminal $222_B$. The biasing of bulk terminals $214_B$ and $216_B$ will be described in detail in conjunction with FIG. 3.

In some embodiments, when electrical device 100 (FIG. 1) is powered off, first power node 102 is either connected to the second power node 104 or left floating. Second power node 104 is still used as the reference ground for the electrical device 100. When first power node 102 is floating and the electrical device 100 is powered off, first power node 102 has a voltage level relatively closer to the ground level than a voltage level at input node 146 induced by an ESD event at the input pad 142. Also, because the gate terminal $222_G$ is coupled to the second power node, PMOS transistor 222 is turned on, and control node 242 is electrically coupled to the first power node 102. Thus, if an ESD induced voltage event presents at input node 146, the voltage level at the gate terminal $212_G$ of NMOS transistor 212 is 0V (i.e., "ground" with respect to the voltage level of second power node 104) or a relatively low voltage level, which is also referred to as "floating ground" in this disclosure. Under these circumstances, if the ESD induced voltage at input node 146 is greater than a predetermined voltage level, the voltage level at gate terminal $212_G$ becomes ground or floating ground, and NMOS transistor 212 is thus turned off.

In some embodiments, when electrical device 100 (FIG. 1) is powered on and at a normal operation mode, first power node 102 receives a positive power supply voltage and second power node 104 receives a negative power supply voltage or ground. Therefore, PMOS transistor 222 is turned on, and the voltage level at control node 242 is equal to that of the positive power supply voltage. As a result, NMOS transistor 212 is turned on.

First detection circuit 220 depicted in FIG. 1 is illustrated as a non-limiting example. Other variations are within the scope of the present disclosure.

Second detection circuit 230 is configured to set a voltage level at the second control node 244 responsive to the voltage level at the first power node 102, the voltage level at the second power node 104, and the voltage level at the first input node 146. Second detection circuit 230 includes a PMOS transistor 232, an NMOS transistor 234, and a resistive device 236.

PMOS transistor 232 has a first S/D terminal $232_{D1}$ coupled to the first input node 146, a second S/D terminal $232_{D2}$ coupled to the second control node 244, a gate terminal coupled to a third control node 238, and a bulk terminal $232_B$. The biasing of bulk terminal $232_B$ will be described in detail in conjunction with FIG. 4.

NMOS transistor 234 has a first S/D terminal $234_{D1}$ coupled to the second input node 148, a second S/D terminal $234_{D2}$ coupled to the second control node 244, a gate terminal $234_G$ coupled to the third control node 238, and a bulk terminal $234_B$. In some embodiments, bulk terminal $234_B$ is coupled to the second power node.

The resistive device 236 is coupled between third control node 238 and first power node 102. In some embodiments, resistive device 236 is omitted, and third control node 238 is directly coupled to first power node 102.

In some embodiments, when electrical device 100 (FIG. 1) is powered off and the ESD induced voltage at input node 146 is greater than the predetermined voltage level, the voltage level at first power node 102 is either ground or floating ground. Therefore, PMOS transistor 232 is turned on, input node 146 and second control node 244 are electrically coupled together. The gate terminals $214_G$ and $216_G$ of PMOS transistors 214 and 216 then have a voltage level similar to the ESD induced voltage at input node 146. Thus, PMOS transistors 214 and 216 are turned off. Meanwhile, NMOS transistor 234 is turned off.

In some embodiments, when electrical device 100 (FIG. 1) is powered on and at a normal operation mode, first power node 102 receives the positive power supply voltage and second power node 104 receives the negative power supply voltage or ground. Therefore, the voltage level at control node 238 is equal to the positive power supply voltage, and therefore PMOS transistor 232 is turned off and NMOS transistor 234 is turned on. Depending on the voltage level at the second input node 148, voltage level at second control node 244 is between 0 V to a voltage level equals positive power supply voltage minus threshold voltage of NMOS transistor 234. Accordingly, voltage level at gate terminals $214_G$ and $216_G$ of PMOS transistors 214 and 216 is at a level sufficient to turn on PMOS transistors 214 and 216 regardless the voltage level of input node 148.

Second detection circuit 230 depicted in FIG. 1 is illustrated as a non-limiting example. Other variations are within the scope of the present disclosure.

Figure 3:
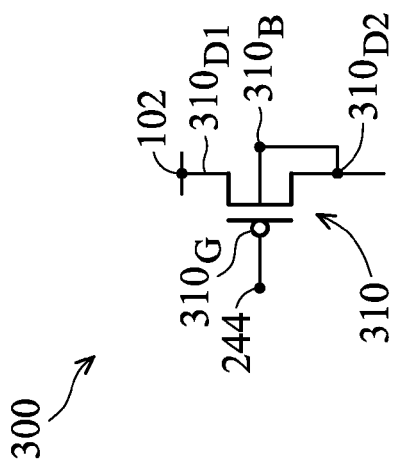
FIG. 3 is a bulk biasing circuit usable for biasing one or more bulk terminals in the switch circuit depicted in FIG. 2 in accordance with one or more embodiments.

FIG. 3 is a bulk biasing circuit 300 usable for biasing one or more bulk terminals $214_B$, $216_B$, or $222_B$ in the switch circuit 200 depicted in FIG. 2 in accordance with one or more embodiments. As depicted in FIGS. 2 and 3, bulk biasing circuit 300 is configured to electrically decouple the first power node 102 and the bulk terminal(s) $214_B$, $216_B$, or $222_B$ responsive to the voltage level at the first power node 102 and the voltage level at the second control node 244. In some embodiments, when the voltage level at first power node 102 is either ground or floating ground and an ESD induced voltage at the first input node 146, bulk biasing circuit 300 is capable of preventing parasitic diodes formed by terminals $214_B$ and $214_{D1}$, terminals $216_B$ and $216_{D1}$, terminals $222_B$ and $222_{D2}$ become forward-biased.

Bulk biasing circuit 300 includes a PMOS transistor 310. PMOS transistor 310 includes a first S/D terminal $310_{D1}$ coupled to the first power node 102, a second S/D terminal $310_{D2}$ coupled to one or more of bulk terminals $214_B$, $216_B$, or $222_B$ of PMOS transistors 214, 216, or 222. PMOS transistor 310 further includes a gate terminal $310_G$ coupled to the second control node 244, and a bulk terminal $310_B$ coupled to the second S/D terminal $310_{D2}$.

In some embodiments, when electrical device 100 (FIG. 1) is powered off and the ESD induced voltage at input node 146 is greater than the predetermined voltage level, the voltage level at gate terminal $310_G$ receives the voltage from the second control node 244 and thus equals the ESD induced voltage. The voltage level at first S/D terminal $310_{D1}$ is either ground or floating ground. Therefore, PMOS transistor 310 is turned off, and the voltage level at second S/D terminal $310_{D2}$ is dynamic floating. As a result, cathode terminals of parasitic diodes formed by terminals $214_B$ and $214_{D1}$, terminals $216_B$ and $216_{D1}$, terminals $222_B$ and $222_{D2}$ are floating, and the corresponding parasitic diodes thus are not forward-biased.

In some embodiments, when electrical device 100 (FIG. 1) is powered on and at a normal operation mode, first power node 102 receives the positive power supply voltage and gate terminal $310_G$ receives the voltage level at second control node 244, which is sufficient to turn on PMOS transistor 310. Therefore, the voltage level at second S/D terminal $310_{D2}$ equals the voltage level at the first power node 102. As a result, cathode terminals of parasitic diodes formed by terminals $214_B$ and $214_{D1}$, $214_E$ and $214_{D2}$, terminals $216_B$ and $216_{D1}$, terminals $216_B$ and $216_{D2}$, terminals $222_B$ and $222_{D1}$, and terminals $222_B$ and $222_{D2}$ are tied to the positive power supply voltage in order to prevent corresponding parasitic diodes become forward-biased.

Bulk biasing circuit 300 depicted in FIG. 3 is illustrated as a non-limiting example. Other variations are within the scope of the present disclosure.

Figure 4:
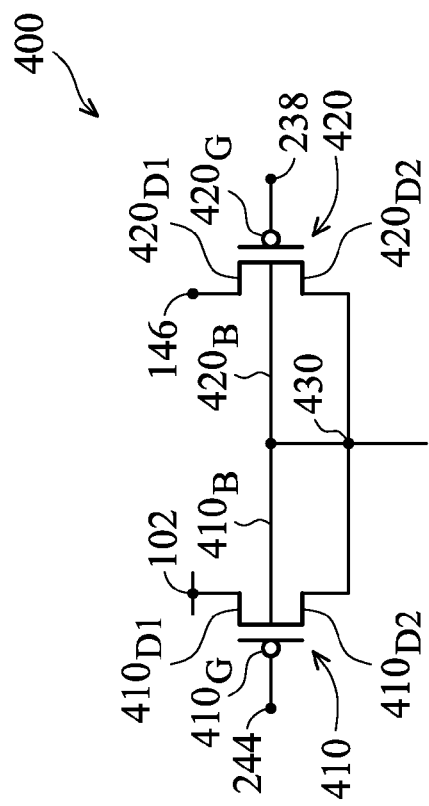
FIG. 4 is another bulk biasing circuit usable for biasing one or more bulk terminals in the switch circuit depicted in FIG. 2 in accordance with one or more embodiments.

FIG. 4 is another bulk biasing circuit 400 usable for biasing one or more bulk terminals, such as bulk terminal $232_B$, in the switch circuit depicted in FIG. 2 in accordance with one or more embodiments. As depicted in FIGS. 2 and 4, bulk biasing circuit 400 is configured to electrically couple either the first power node 102 or the first input node 146 with the bulk terminal $232_B$ responsive to the voltage level at the first power node 102 and the voltage level at the second control node 244. In some embodiments, when the voltage level at first power node 102 is either ground or floating ground and an ESD induced voltage presents at the first input node 146, bulk biasing circuit 400 is capable of preventing parasitic diodes formed by terminals $232_B$ and $232_{D1}$ terminals become forward-biased.

Bulk biasing circuit 400 has PMOS transistors 410 and 420. PMOS transistor 410 has a first S/D terminal $410_{D1}$ coupled to the first power node 102, a second S/D terminal $410_{D2}$ coupled to a node 430, a gate terminal $410_G$ coupled to the second control node 244, and a bulk terminal $410_B$ coupled to node 430. PMOS transistor 420 has a first S/D terminal $420_{D1}$ coupled to the first input node 146, a second S/D terminal $420_{D2}$ coupled to node 430, a gate terminal $420_G$ coupled to the third control node 238, and a bulk terminal $420_B$ coupled to node 430. In some embodiments, node 430 is coupled to bulk terminal $232_B$ of PMOS transistor 232 (FIG. 2).

In some embodiments, when electrical device 100 (FIG. 1) is powered off and the ESD induced voltage at input node 146 is greater than the predetermined voltage level, the voltage level at gate terminal $420_G$ receives the voltage from the third control node 238 and thus is ground or floating ground. As such, PMOS transistor 420 is turned on, and node 430 receives the voltage from the first input node 146 and thus equals the ESD induced voltage. Meanwhile, the voltage level at gate terminal $410_G$ receives the voltage from the second control node 244 and thus equals the ESD induced voltage. Therefore, PMOS transistor 410 is turned off. As a result, cathode terminals of parasitic diodes formed by terminals $232_B$ and $232_{D1}$ and $232_B$ and $232_{D2}$, i.e., bulk terminal $232_B$ is biased at the ESD induced voltage, and the corresponding parasitic diodes thus are prevented from being forward-biased.

In some embodiments, when electrical device 100 (FIG. 1) is powered on and at a normal operation mode, first power node 102 receives the positive power supply voltage and gate terminal $410_G$ receives the voltage level at second control node 244, which is sufficient to turn on PMOS transistor 410. Therefore, the voltage level at node 430 equals the voltage level at the first power node 102. As a result, cathode terminals of parasitic diodes formed by terminals $232_B$ and $232_{D1}$ and $232_B$ and $232_{D2}$, i.e., bulk terminal $232_B$ is biased at the positive power supply voltage, and the corresponding parasitic diodes thus are prevented from being forward-biased.

Bulk biasing circuit 400 depicted in FIG. 4 is illustrated as a non-limiting example. Other variations are within the scope of the present disclosure.

In some embodiments, using bulk bias circuit 300 and/or bulk bias circuit 400 to control voltage levels of one or more of bulk terminals $214_B$, $216_B$, or $232_B$ prevents current leakage paths from corresponding PMOS transistors 214, 216, or 232 when the electrical device 100 (FIG. 1) is powered off. In some embodiments, bulk terminals $214_B$, $216_B$, or $232_B$ are connected to the first power node 102, and thus corresponding bulk bias circuit is omitted.

In some embodiments, using bulk bias circuit 300 to control voltage level of bulk terminal $222_B$ increases the turned-on resistance of PMOS transistor 222. In some embodiments, bulk terminal $222_B$ is connected to the first power node 102, and thus corresponding bulk bias circuit is omitted.

Figure 5:
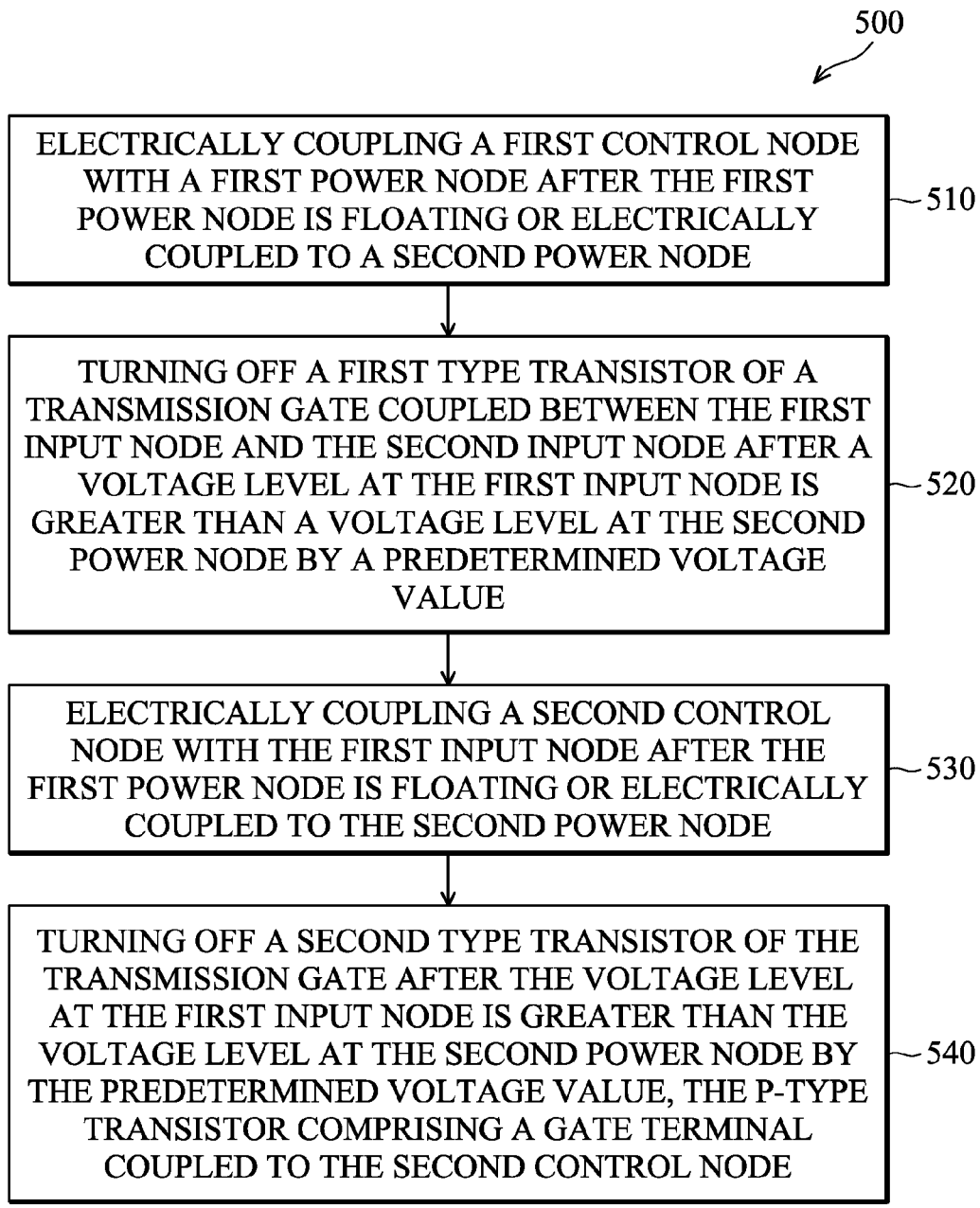
FIG. 5 is a flowchart of a method of decoupling a first input node from a second input node in accordance with one or more embodiments.

FIG. 5 is a flowchart of a method 500 of decoupling a first input node 146 (FIG. 2) from a second input node 148 (FIG. 2) in accordance with one or more embodiments. It is understood that additional operations may be performed before, during, and/or after the method 500 depicted in FIG. 5, and that some other processes may only be briefly described herein. In some embodiments, one or more operations depicted in FIG. 5 are omitted.

As depicted in FIGS. 2 and 5, in operation 510, first control node 242 is electrically coupled with first power node 102 after the device 100 is powered off, i.e., first power node 102 is floating or electrically coupled to second power node 104.

Gate terminal $212_G$ of NMOS transistor 212 is coupled to the first control node 242. In operation 520, NMOS transistor 212 is turned off after the voltage level at the first input node 146 is greater than a voltage level at the second power node 104 (as a reference ground) by a predetermined voltage value.

In operation 530, second control node 244 is electrically coupled with first input node 146 after first power node 102 is floating or electrically coupled to second power node 104.

Gate terminals $214_G$, $216_G$ of PMOS transistors 214 and 216 are coupled to the second control node 244. In operation 530, PMOS transistors 214 and 216 are turned off after the voltage level at the first input node 146 is greater than the voltage level at the second power node 104 by the predetermined voltage value.

In accordance with one embodiment, a device includes a first power node, a second power node, a first input node, a second input node, a protected circuit, and a switch circuit. The protected circuit is coupled between the first power node and the second power node, and the protected circuit is further coupled with the second input node. The switch circuit is coupled with the first power node, the second power node, the first input node, and the second input node. The switch circuit is configured to electrically decouple the first input node and the second input node after (a) the first power node is floating or electrically coupled to the second power node and (b) a voltage level at the first input node is greater than a voltage level at the second power node by a predetermined voltage value.

In accordance with another embodiment, a switch circuit includes a first power node, a second power node, a first signal node, a second signal node, a first detection circuit, a second detection circuit, and a transmission gate. The first detection circuit is configured to set a voltage level at a first control node responsive to a voltage level at the first power node, a voltage level at the second power node, and a voltage level at the first signal node. The second detection circuit is configured to set a voltage level at a second control node responsive to the voltage level at the first power node, the voltage level at the second power node, and the voltage level at the first signal node. The transmission gate is configured to electrically couple or decouple the first signal node and the second signal node responsive to the voltage level at the first control node and the voltage level at the second control node.

In accordance with another embodiment, a method of electrically decoupling a first signal node from a second signal node includes electrically coupling a first control node with a first power node after the first power node is floating or electrically coupled to a second power node. A first-type transistor of a transmission gate coupled between the first signal node and the second signal node is turned off after a voltage level at the first input node is greater than a voltage level at the second power node by a predetermined voltage value. The first-type transistor has a gate terminal coupled to the first control node. A second control node is electrically coupled with the first signal node after the first power node is floating or electrically coupled to the second power node. A second-type transistor of the transmission gate is turned off after the voltage level at the first signal node is greater than the voltage level at the second power node by the predetermined voltage value. The second-type transistor includes a gate terminal coupled to the second control node.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device comprising:
a first power node;
a second power node;
a first input node;
a second input node;
a protected circuit coupled between the first power node and the second power node, the protected circuit further being coupled with the second input node;
a switch circuit coupled with the first power node, the second power node, the first input node, and the second input node, the switch circuit being configured to electrically decouple the first input node and the second input node after (a) the first power node is floating or electrically coupled to the second power node and (b) a voltage level at the first input node is greater than a voltage level at the second power node by a predetermined voltage value,
wherein the switch circuit comprises:
a first detection circuit configured to set a voltage level at a first control node responsive to a voltage level at the first power node, the voltage level at the second power node, and the voltage level at the first input node;
a second detection circuit configured to set a voltage level at a second control node responsive to the voltage level at the first power node, the voltage level at the second power node, and the voltage level at the first input node; and
a transmission gate configured to electrically couple or decouple the first input node and the second input node responsive to the voltage level at the first control node and the voltage level at the second control node.

2. The device of claim 1, wherein the transmission gate comprises:
at least one first-type transistor coupled between the first input node and the second input node and configured to be controlled by the voltage level at the first control node; and
at least two second-type transistors coupled in series between the first input node and the second input node and configured to be controlled by the voltage level at the second control node.

3. The device of claim 2, wherein the switch circuit further comprises a bulk biasing circuit coupled to a bulk terminal of one of the at least two second-type transistors, the bulk biasing circuit being configured to electrically decouple the first power node and the bulk terminal responsive to the voltage level at the first power node and the voltage level at the second control node.

4. The device of claim 3, wherein the bulk biasing circuit comprises another second-type transistor, the another second-type transistor comprising a first source or drain (S/D) terminal coupled to the first power node, a second S/D terminal coupled to the bulk terminal of the one of the at least two second-type transistors, a gate terminal coupled to the second control node, and a bulk terminal coupled to the second S/D terminal of the another second-type transistor.

5. The device of claim 1, wherein the transmission gate comprises:
a first-type transistor having a first source or drain (S/D) terminal coupled to the first input node, a second S/D terminal coupled to the second input node, and a gate terminal coupled to the first control node;
a first second-type transistor having a first S/D terminal coupled to the first input node, a second S/D terminal, and a gate terminal coupled to the second control node; and
a second second-type transistor having a first S/D terminal coupled to the second S/D terminal of the first second-type transistor, a second S/D terminal coupled to the second input node, and a gate terminal coupled to the second control node.

6. The device of claim 1, wherein the first detection circuit comprises:
a second-type transistor comprising a first source or drain (S/D) terminal coupled to the first power node, a second S/D terminal coupled to the first control node, and a gate terminal coupled to the second power node.

7. The device of claim 6, wherein
the transistor further comprises a bulk terminal, and
the switch circuit further comprises a bulk biasing circuit coupled to the bulk terminal of the transistor, the bulk biasing circuit being configured to electrically decouple the first power node and the bulk terminal responsive to the voltage level at the first power node and the voltage level at the second control node.

8. The device of claim 1, wherein the second detection circuit comprises:
a third control node;
a first-type transistor comprising a first source or drain (S/D) terminal coupled to the second input node, a second S/D terminal coupled to the second control node, and a gate terminal coupled to the third control node; and
a first second-type transistor comprising a first S/D terminal coupled to the first input node, a second S/D terminal coupled to the second control node, and a gate terminal coupled to the third control node.

9. The device of claim 8, wherein the second detection circuit further comprises:
a resistive device between the first power node and the third control node.

10. The device of claim 8, wherein
the first second-type transistor further comprises a bulk terminal, and
the switch circuit further comprises a bulk biasing circuit coupled to the bulk terminal of the first second-type transistor, the bulk biasing circuit being configured to electrically couple either the first power node or the first input node with the bulk terminal responsive to the voltage level at the first power node and the voltage level at the second control node.

11. The device of claim 10, wherein the bulk biasing circuit comprises:
a second second-type transistor comprising a first S/D terminal coupled to the first power node, a second S/D terminal coupled to the bulk terminal of the first second-type transistor, a gate terminal coupled to the second control node, and a bulk terminal coupled to the bulk terminal of the first second-type transistor; and
a third second-type transistor comprising a first S/D terminal coupled to the first input node, a second S/D terminal coupled to the bulk terminal of the first second-type transistor, a gate terminal coupled to the third control node, and a bulk terminal coupled to the bulk terminal of the first second-type transistor.

12. A switch circuit comprising:
a first power node;

a second power node;
a first signal node;
a second signal node;
a first detection circuit configured to set a voltage level at a first control node responsive to a voltage level at the first power node, a voltage level at the second power node, and a voltage level at the first signal node;
a second detection circuit configured to set a voltage level at a second control node responsive to the voltage level at the first power node, the voltage level at the second power node, and the voltage level at the first signal node; and
a transmission gate configured to electrically couple or decouple the first signal node and the second signal node responsive to the voltage level at the first control node and the voltage level at the second control node.

13. The switch circuit of claim 12, wherein the transmission gate comprises:
a N-type transistor having a first source or drain (S/D) terminal coupled to the first signal node, a second S/D terminal coupled to the second signal node, and a gate terminal coupled to the first control node;
a first P-type transistor having a first S/D terminal coupled to the first signal node, a second S/D terminal, and a gate terminal coupled to the second control node; and
a second P-type transistor having a first S/D terminal coupled to the second S/D terminal of the first P-type transistor, a second S/D terminal coupled to the second signal node, and a gate terminal coupled to the second control node.

14. The switch circuit of claim 13, wherein the switch circuit further comprises a bulk biasing circuit coupled to the bulk terminals of the first and second P-type transistors, the bulk biasing circuit comprising:
a third P-type transistor, the third P-type transistor comprising a first S/D terminal coupled to the first power node, a second S/D terminal coupled to the bulk terminals of the first and second P-type transistors, a gate terminal coupled to the second control node, and a bulk terminal coupled to the second S/D terminal of the third P-type transistor.

15. The switch circuit of claim 12, wherein the first detection circuit comprises:
a P-type transistor comprising a first source or drain (S/D) terminal coupled to the first power node, a second S/D terminal coupled to the first control node, and a gate terminal coupled to the second power node.

16. The switch circuit of claim 15, wherein
the P-type transistor further comprises a bulk terminal, and
the switch circuit further comprises a bulk biasing circuit coupled to the bulk terminal of the P-type transistor, the bulk biasing circuit being configured to electrically decouple the first power node and the bulk terminal responsive to the voltage level at the first power node and the voltage level at the second control node.

17. The switch circuit of claim 12, wherein the second detection circuit comprises:
a third control node;
a first P-type transistor comprising a first source or drain (S/D) terminal coupled to the first signal node, a second S/D terminal coupled to the second control node, and a gate terminal coupled to the to the third control node;
a N-type transistor comprising a first S/D terminal coupled to the second signal node, a second S/D terminal coupled to the second control node, and a gate terminal coupled to the third control node; and
a resistive device between the first power node and the third control node.

18. The switch circuit of claim 17, wherein
the first P-type transistor further comprises a bulk terminal, and
the switch circuit further comprises a bulk biasing circuit coupled to the bulk terminal of the first P-type transistor, the bulk biasing circuit comprising:
a second P-type transistor comprising a first S/D terminal coupled to the first power node, a second S/D terminal coupled to the bulk terminal of the first P-type transistor, a gate terminal coupled to the second control node, and a bulk terminal coupled to the bulk terminal of the first P-type transistor; and
a third P-type transistor comprising a first S/D terminal coupled to the first signal node, a second S/D terminal coupled to the bulk terminal of the first P-type transistor, a gate terminal coupled to the third control node, and a bulk terminal coupled to the bulk terminal of the first P-type transistor.

19. A method of electrically decoupling a first input node from a second input node, comprising:
electrically coupling a first control node with a first power node after the first power node is floating or electrically coupled to a second power node;
turning off a first-type transistor of a transmission gate coupled between the first input node and the second input node after a voltage level at the first input node is greater than a voltage level at the second power node by a predetermined voltage value, the first-type transistor comprising a gate terminal coupled to the first control node;
electrically coupling a second control node with the first input node after the first power node is floating or electrically coupled to the second power node; and
turning off a first second-type transistor of the transmission gate after the voltage level at the first input node is greater than the voltage level at the second power node by the predetermined voltage value, the first second-type transistor comprising a gate terminal coupled to the second control node.

20. The method of claim 19, further comprising turning off a second second-type transistor of the transmission gate after the voltage level at the first input node is greater than the voltage level at the second power node by the predetermined voltage value, the second second-type transistor comprising a gate terminal coupled to the second control node and a source terminal or a drain terminal coupled to a source terminal or a drain terminal of the first second-type transistor.

* * * * *